United States Patent
Takayasu et al.

(10) Patent No.: US 12,008,229 B2
(45) Date of Patent: Jun. 11, 2024

(54) VARYING ICONS TO IMPROVE OPERABILITY

(75) Inventors: Masaaki Takayasu, Tokyo (JP); Shinya Taniguchi, Tokyo (JP); Hiroyuki Goto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 331 days.

(21) Appl. No.: 13/611,242

(22) Filed: Sep. 12, 2012

(65) Prior Publication Data

US 2013/0132873 A1 May 23, 2013

(30) Foreign Application Priority Data

Nov. 22, 2011 (JP) ................................. 2011-255504

(51) Int. Cl.
*G06F 3/0488* (2022.01)
*A63F 13/2145* (2014.01)
*A63F 13/67* (2014.01)
*G06F 3/041* (2006.01)
*G06F 3/04842* (2022.01)

(52) U.S. Cl.
CPC ........ *G06F 3/0488* (2013.01); *A63F 13/2145* (2014.09); *A63F 13/67* (2014.09); *G06F 3/04186* (2019.05); *G06F 3/04842* (2013.01)

(58) Field of Classification Search
CPC .... G06F 3/048; G06F 3/0481; G06F 3/04817; G06F 3/0488; G06F 3/04186; G06F 3/04842; A63F 13/2145; A63F 13/67
USPC ....... 715/764, 790, 791, 792, 793, 794, 795, 715/796, 797
See application file for complete search history.

(56) References Cited

U.S. PATENT DOCUMENTS

| | | | | |
|---|---|---|---|---|
| 5,757,358 A | * | 5/1998 | Osga | G06F 3/04842 345/157 |
| 5,963,671 A | * | 10/1999 | Comerford | G06V 30/268 382/230 |
| 6,040,824 A | * | 3/2000 | Maekawa | G06C 21/3682 345/173 |

(Continued)

FOREIGN PATENT DOCUMENTS

| | | |
|---|---|---|
| CN | 101573176 | 3/2010 |
| JP | 2001-101304 | 4/2001 |

(Continued)

OTHER PUBLICATIONS

Graphical user interface, http://en.wikipedia.org/w/index.php?title=Graphical_user_interface&oldid=616213631 (last visited Jul. 18, 2014).*

(Continued)

*Primary Examiner* — Justin R. Blaufeld
(74) *Attorney, Agent, or Firm* — XSENSUS LLP (57) ABSTRACT

In an image displayed on a display under a normal condition, the locations where items to choose from are located are indicated by icons. When a user touches a contact point, icons located within a predetermined range from the contact point are detected from among the icons. Then the locations of the detected icons are varied such that they are located on a circle, with the circle's center at the contact point, at equal spaces between the detected icons. A pointer graphic that indicates the original position of each icon in the original image is added to each icon.

2 Claims, 5 Drawing Sheets

(56) References Cited

U.S. PATENT DOCUMENTS

| | | | | |
|---|---|---|---|---|
| 6,046,722 | A * | 4/2000 | McKiel, Jr. | G06F 3/04842 345/157 |
| 6,259,436 | B1 * | 7/2001 | Moon | G06F 3/0488 715/810 |
| 8,286,096 | B2 * | 10/2012 | Shibaike | G06F 3/0468 345/650 |
| 8,516,397 | B2 * | 8/2013 | Frazier | G06F 3/0481 715/862 |
| 2002/0191029 | A1 * | 12/2002 | Gillespie | G06F 3/04817 715/810 |
| 2003/0007015 | A1 * | 1/2003 | Laffey | G06F 3/04842 715/860 |
| 2003/0007016 | A1 * | 1/2003 | Laffey | G06F 3/04812 715/861 |
| 2003/0007017 | A1 * | 1/2003 | Laffey | G06F 3/04812 715/862 |
| 2004/0243306 | A1 * | 12/2004 | Han | G01C 21/3682 340/995.14 |
| 2005/0187023 | A1 * | 8/2005 | Miyamoto | A63F 13/10 463/43 |
| 2006/0262145 | A1 * | 11/2006 | Zhang | G06Q 10/10 345/661 |
| 2008/0307351 | A1 * | 12/2008 | Louch | G06F 3/0483 715/782 |
| 2009/0089694 | A1 * | 4/2009 | Mori | A63F 13/56 715/764 |
| 2009/0100343 | A1 * | 4/2009 | Lee | G06F 3/04817 715/764 |
| 2010/0060599 | A1 * | 3/2010 | Kwak | G06F 16/168 345/173 |
| 2010/0077361 | A1 * | 3/2010 | Watkins | G01C 21/3682 715/846 |
| 2010/0259561 | A1 * | 10/2010 | Forutanpour | G06F 3/0238 345/173 |
| 2010/0315266 | A1 * | 12/2010 | Gunawardana | G06F 3/0237 341/22 |
| 2011/0041056 | A1 * | 2/2011 | Griffin | G06F 3/04886 715/708 |
| 2011/0055739 | A1 * | 3/2011 | MacFarlane | G06F 3/0488 715/764 |
| 2011/0078613 | A1 * | 3/2011 | Bangalore | G06F 1/1684 345/169 |
| 2011/0141128 | A1 * | 6/2011 | Choi | G06F 3/04845 715/764 |
| 2011/0252346 | A1 * | 10/2011 | Chaudhri | H04M 1/72469 715/765 |
| 2012/0054654 | A1 * | 3/2012 | Miyazawa et al. | 715/767 |
| 2013/0194308 | A1 * | 8/2013 | Privault | G06F 3/04842 345/650 |
| 2015/0040052 | A1 * | 2/2015 | Noel | G06F 3/04847 715/771 |
| 2015/0106726 | A1 * | 4/2015 | Nagasaki | G06F 3/04842 715/739 |
| 2016/0188178 | A1 * | 6/2016 | Wang | G06F 3/04842 715/845 |

FOREIGN PATENT DOCUMENTS

| | | | | |
|---|---|---|---|---|
| JP | | 2007-233511 | 9/2007 | |
| JP | | 2011-2100813 | 10/2011 | |
| JP | | 2012181590 A * | 9/2012 | G06F 3/041 |
| WO | WO 2012041175 A1 * | | 4/2012 | G06F 3/0482 |

OTHER PUBLICATIONS

Dictionary.com, "vary," in Online Etymology Dictionary. Source location: Douglas Harper, Historian.http://dictionary.reference.com/browse/vary. Available: http://dictionary.reference.com. Accessed: Oct. 1, 2015.*

Dictionary.com, "move," in Dictionary.com Unabridged. Source location: Random House, Inc. http://dictionary.reference.com/browse/move. Available: http://dictionary.reference.com. Accessed: Oct. 1, 2015.*

Dictionary.com, "near," in Online Etymology Dictionary. Source location: Douglas Harper, Historian.http://dictionary.reference.com/browse/near. Available: http://dictionary.reference.com. Accessed: Oct. 1, 2015.*

Chinese Second Office Action dated Dec. 8, 2015 from corresponding Application No. 201210471993.1.

European Search Report dated Oct. 29, 2015 from corresponding Application No. 12191883.3.

* cited by examiner

VARYING ICONS TO IMPROVE OPERABILITY

BACKGROUND OF THE INVENTION

1. Field of the Invention

The present invention relates to an information processing apparatus for processing information and simultaneously displaying the resulting images, as well as an information processing method employed by the information processing apparatus.

2. Description of the Related Art

Recent years have seen widespread use of small information devices intended for mobile use, such as mobile game devices, mobile phones, PDAs (personal digital assistants), and tablet terminals. These devices have been subject to a limited variety of input means because of their size limitations and their expected operability while they are carried around by users. As a result, the input means and functions specialized in usage for such devices have been undergoing a development on their own.

To this end, a device capable of displaying and being input information thereon in the same region by placing a touch panel over a display has been commonly used in recent years. Provision of the touch panel like this allows the selection and movement of subjects such as icons and the enlargement/reduction, scrolling, and page turning of a display screen image on a web page or document to be conducted as if an actual thing exists before the user even though those objects, documents and the like are merely present in the two-dimensional plane. Hence, this permits intuitive responses and operations.

The diversification and sophistication of functions provided in the information devices continue to grow regardless the size of the information devices. When the touch panel is used as the input means in such situations, more minute operation is required for displaying more sophisticated information and for a smaller-sized screen. This can be stressful to the users. Where such an operation is done by the contact of a finger in particular, an erroneous operation due to the contact area is more likely to occur as compared with the case where a stylus pen or pointing device is used. Thus, the problem of achieving an easy operation regardless of the screen size and the size of an object to be operated is yet to be addressed.

SUMMARY OF THE INVENTION

The present invention has been made in view of these problems, and a purpose thereof is to provide a technology for realizing input means having high operability even when highly sophisticated information is required to be displayed.

One embodiment of the present invention relates to an information processing apparatus. The information processing apparatus includes: an operating information acquiring unit configured to acquire information regarding a specific position, inputted by a user, in a display image and configured to detect in the display image a graphical user icon (GUI) located within a predetermined range from the specific position; a GUI location control unit configured to vary the locations of a plurality of GUIs on the display image, when the plurality of GUIs are detected by the operating information acquiring unit; and an information processing unit configured to perform information processing corresponding to a GUI, according to a user's operation on said GUI whose location has been varied.

Another embodiment of the present invention relates to a method for processing information. The information processing method includes: acquiring information regarding a specific position, inputted by a user, in a display image and detecting in the display image a graphical user icon (GUI) located within a predetermined range from the specific position; and varying the locations of a plurality of GUIs on the display image when the plurality of GUIs are detected, and displaying the GUIs at the varied locations on a display.

Optional combinations of the aforementioned constituting elements, and implementations of the invention in the form of methods, apparatuses, systems, recording media, computer programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
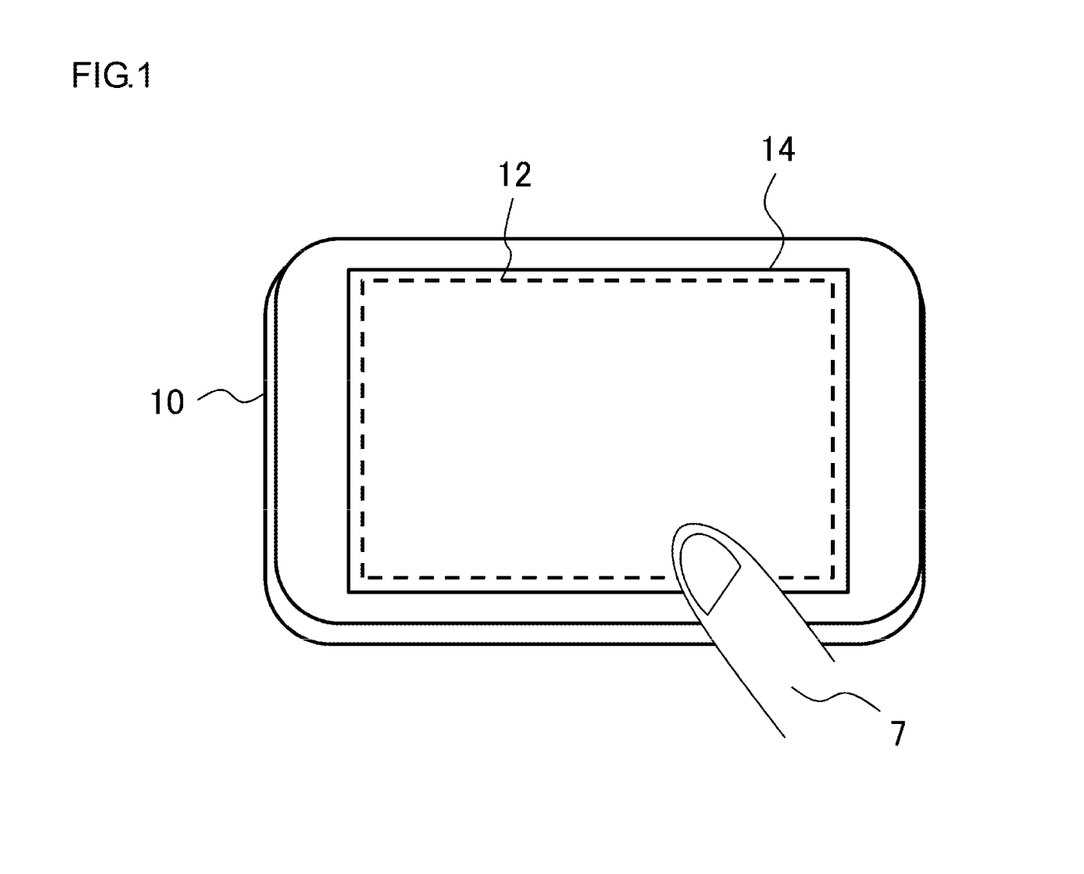
FIG. 1 illustrates an example of the appearance of an information processing apparatus according to an embodiment of the present invention.

FIG. 1 illustrates an example of the appearance of an information processing apparatus according to an embodiment of the present invention. The information processing apparatus may be any one of a mobile phone, a portable digital assistant (PDA), a mobile game device, a tablet terminal, and the like that are each provided with a display function and the other information processing functions in an integrated fashion. Alternatively, a device having the appearance like that of the information processing apparatus 10 as shown in FIG. 1 may be a unit used for display and input purposes, and the remaining information processing functions may be provided in a separate casing that connects to said unit. The information processing apparatus 10 may be provided with various types of mechanism and components according to the functions. Since a known art may be used for such mechanisms and components, the description thereof will be omitted as appropriate.

The information processing apparatus 10 is structured such that the a display 14 is placed in from of the body of the information processing apparatus 10 and the top surface is covered with a touch panel 12. The components required for various information processings such as a CPU, a graphics processor, an audio processor, and a memory (all of which are not shown in FIG. 1) are incorporated into the back side of the display 14. The display 14 may be any one of a liquid crystal display, an electro luminescent display (ELD), a plasma display and the like which are commonly used today.

The touch panel 12 may implement any of a resistive overlay method, an optical method, an electrostatic capacitance coupling method, and the like which are in practical use. The touch panel detects a contact point by a finger 7. The information processing apparatus 10 may further comprise a speaker for outputting audio, an earphone connection terminal, an infrared port or wireless LAN (Local Area Network) feature used to communicate with other devices, a battery box, and the like all of which are omitted in FIG. 1. The display 14 displays a menu screen or a screen including an icon for the input of a user's operation, a game screen, a moving-image playback screen, a text display screen, a still-image display screen or the like which indicates the results of information processings, according to the functions of the information processing apparatus 10.

Figure 2:
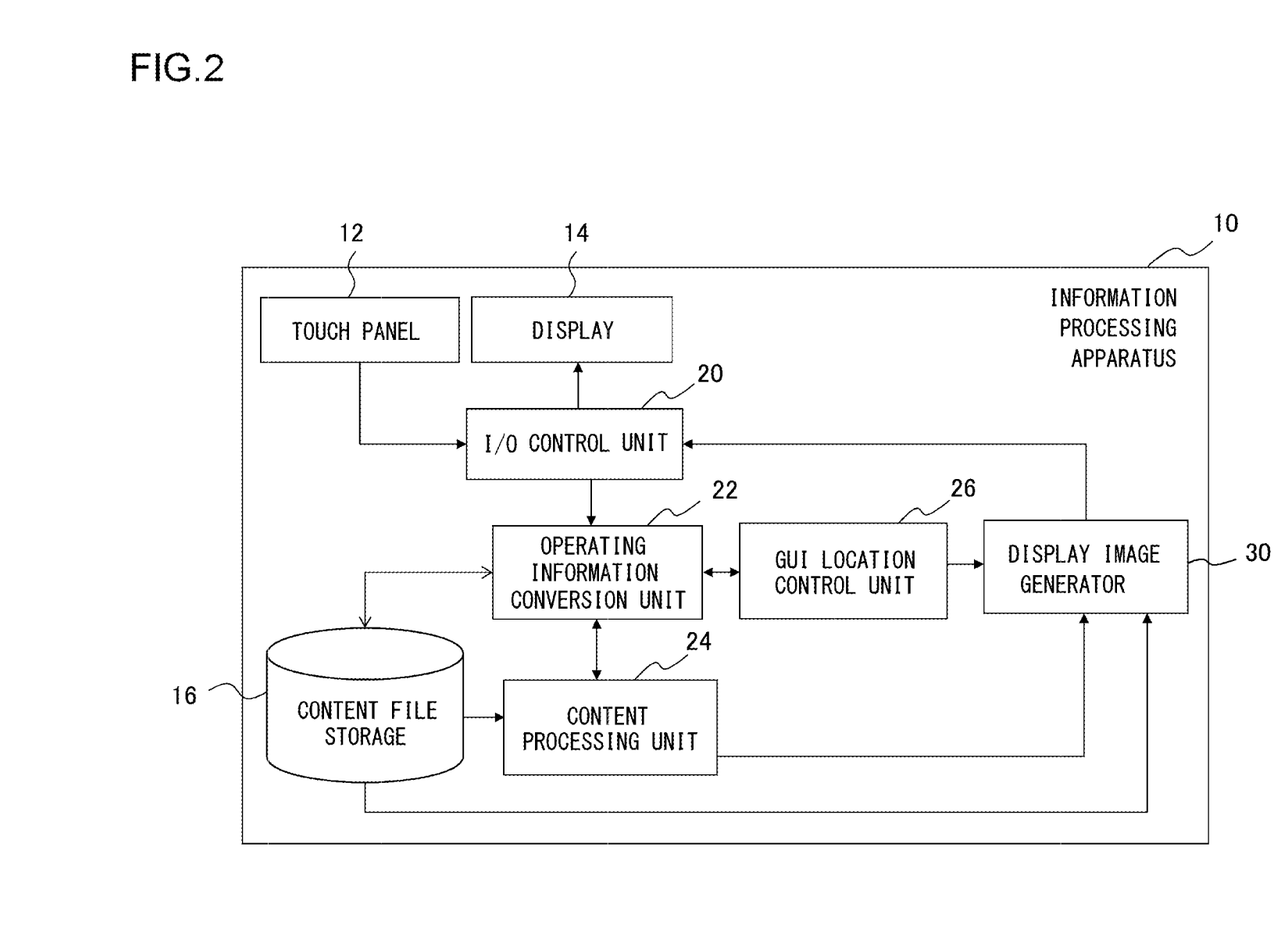
FIG. 2 illustrates a detailed structure of an information processing apparatus according to an embodiment.

FIG. 2 illustrates a detailed structure of an information processing apparatus 10. In addition to the aforementioned touch panel 12 and the display 14, the information processing apparatus 10 includes a content file storage 16 for storing programs and various data for contents, an input/output (I/O) control unit 20 for controlling the receiving of signals inputted from the touch panel 12 and the output of image data to the display 14, an operating information conversion unit 22 for converting an input signal from the touch panel 12 into information regarding an operation input, a content processing unit 24 for processing a content according to the operation input, a GUI location control unit 26 for controlling the location of a GUI according to the contact point, and a display image generator 30 for generating a display image.

In FIG. 2, the structural components described as functional blocks that perform various processings may be implemented hardwarewise by elements such as a CPU (Central Processing Unit), memory and other LSIs, and softwarewise by image processing programs or the like. Therefore, it will be obvious to those skilled in the art that the functional blocks may be implemented by a variety of manners including hardware only, software only or a combination of both and should not be considered as limiting.

The input/output control unit 20 connects to the touch panel 12 and the display 14 and controls the input/output of data using a commonly-used method. The input signal received from the touch panel 12 indicates the coordinates of a contact point at which the user touches on the touch panel 12, a movement (travel) path of the coordinates when the contact point moves continuously, and the like. A method for detecting the contact point on the touch panel 12 differs depending on the employed detecting system and therefore the description thereof is not given here. The input/output control unit 20 also outputs a video signal for a displayed image to the display 14.

The content file storage 16 stores various types of data required for carrying out the information processing regarding the displaying of content according to the user's operation by using the touch panel. The "content" as used herein may be computer games, movies, music, novels, photographs, maps, web pages, and so forth; the types thereof and the path through which data is stored are not limited to any specific ones so long as the subjects thereof can be expressed after electronic processing. Also, the embodiments of the invention can be applied not only to general "content" but also to the general information processing for communications, schedule management, address list, spreadsheet, and the like. In the following description, all of general "content" together with such entities will be collectively referred to as the "content".

If, for example, the content is a game, the content file storage 16 stores the program for the game, information on a player or players, information on the achievement level (score) attained at the previous game play, and so forth. If the content is a movie or music, the content file storage 16 stores video data or audio data that has been compressed and coded, a program used to decode and playback the video data or audio data, and so forth. The content file storage 16 may be a hard disk drive or a combination of a removable recording medium (e.g., memory card, ROM disk, optical disk or magneto-optical disk) and a readout system compatible with the removable recording medium.

The operating information conversion unit 22 acquires from the input/output control unit 20 an input signal fed from the touch panel 12 and identifies the operation input intended by the user based on the coordinates of a contact point contained in the input signal. If, for example, a Graphical User Interface is displayed in a screen as an on-screen display, an operation input corresponding to the GUI which is a target of a touch will be identified based on the correspondence relation between the coordinates of the contact point and the GUI position, and then convey the thus identified operation input to the content processing unit 24.

If there are a plurality of GUIs within a predetermined range from the contact point, the operating information conversion unit 22 will first inform the GUI location control unit 26 of the presence of the GUIs. If, for example, a selection input is to be received in such a manner that a plurality of locations in a virtual world, a map, a three-dimensional object and the like displayed on the display 14 are indicated by their respective icons as options, the icons may be too closely located to each other depending on the scale of the image or the location of a viewpoint.

When a plurality of GUIs are located in close proximity to each other as described above, it is not easy to accurately instruct any of the GUIs to operate through the contact of a finger. Thus, a slight wobble in a finger's position may possibly lead to the operation of an unintended GUI and this is very stressful to the user. In the present embodiment, when the presence of a plurality of GUIs that are located near the contact point is detected, the arrangement of location of the GUIs is temporarily changed so that the space between the GUIs is widened.

Then the user touches again the primarily intended GUI after the distance between the plurality of GUIs has been enlarged as above. As a result, the operating information conversion unit 22 recognizes that this particular GUI is operated and effected. Then the operating information conversion unit 22 conveys the corresponding operation input to the content processing unit 24. Then the operating information conversion unit 22 also detects that the location of GUIs whose distances therebetween have returned to the original (initial) positions, and conveys the thus detected result to the GUI location control unit 26.

The content processing unit 24 performs processings necessary for the progress of a game and the displaying of various content items according to the operation input, using programs and image data stored in the content file storage 16. At this time, the GUIs such as icons indicating the options available are displayed according to the setting in a content file in such a manner that the GUIs are superposed on a content image. A known art appropriate to the content creator's intention may be used for the GUI rendering process performed by the content processing unit 24.

As described above, the GUI location control unit 26 varies the arrangement of GUIs in such a manner as to widen the space between the GUIs and restore the GUIs to the their original positions according to the notification sent from the operating information conversion unit 22. When the space therebetween is to be widened, the positional information on the contact point, the identification information and the positional information on a plurality of GUIs whose positions are to be varied are received from the operating information conversion unit 22. The identification information on the GUIs is associated with the images of the GUIs in the content file stored in the content file storage 16.

Then the GUI location control unit 26 determines the positions of the respective GUIs, whose arrangement have been changed, based on the position of the contact point and conveys the thus determined positions thereof to the display image generator 30 in association with the identification information on the GUIs. When the arrangement of the GUIs is to be restored to the original (initial) arrangement, the positional information on the original positions of the respective GUIs temporarily stored in an internal memory or the like is conveyed to the display image generator 30 in association with the identification information of the GUIs. Whenever the arrangement of the GUIs is to be changed and whenever the changed arrangement thereof is to be restored to the original one, the GUI location control unit 26 also coveys the identification information on the respective GUIs and the positional information on the GUIs after the change, to the operating information conversion unit 22. Thereby, the operating information conversion unit 22 updates the positional information on the GUIs stored therein to the latest one, identifies a GUI associated with the contact point and eventually identifies the content input with accuracy.

The display image generator 30 generates image data to be outputted, in response to a request sent from the content processing unit 24 or the GUI location control unit 26 and outputs the image data to the input/output control unit 20. The image generated by the display image generator 30 is an image to be newly displayed as a result of the processing by the content processing unit 24 or an image for which the GUI is placed in the position specified by the GUI location control unit 26.

In the former case, the display image generator 30 renders a new image by, for example, reading out necessary image data from the content file storage 16 according to an instruction given from the content processing unit 24. In the latter case, the display image generator 30 reads out image data of a GUI associated with the identification information conveyed from the GUI location control unit 26, from the content file storage 16 and renders images where the GUI moves to a specified position. The image thus generated is stored in a frame buffer in the input/output control unit 20 and is displayed on the display 14 when the image is outputted to the display 14, with the suitable timing, from the input/output control unit 20.

Figure 3:
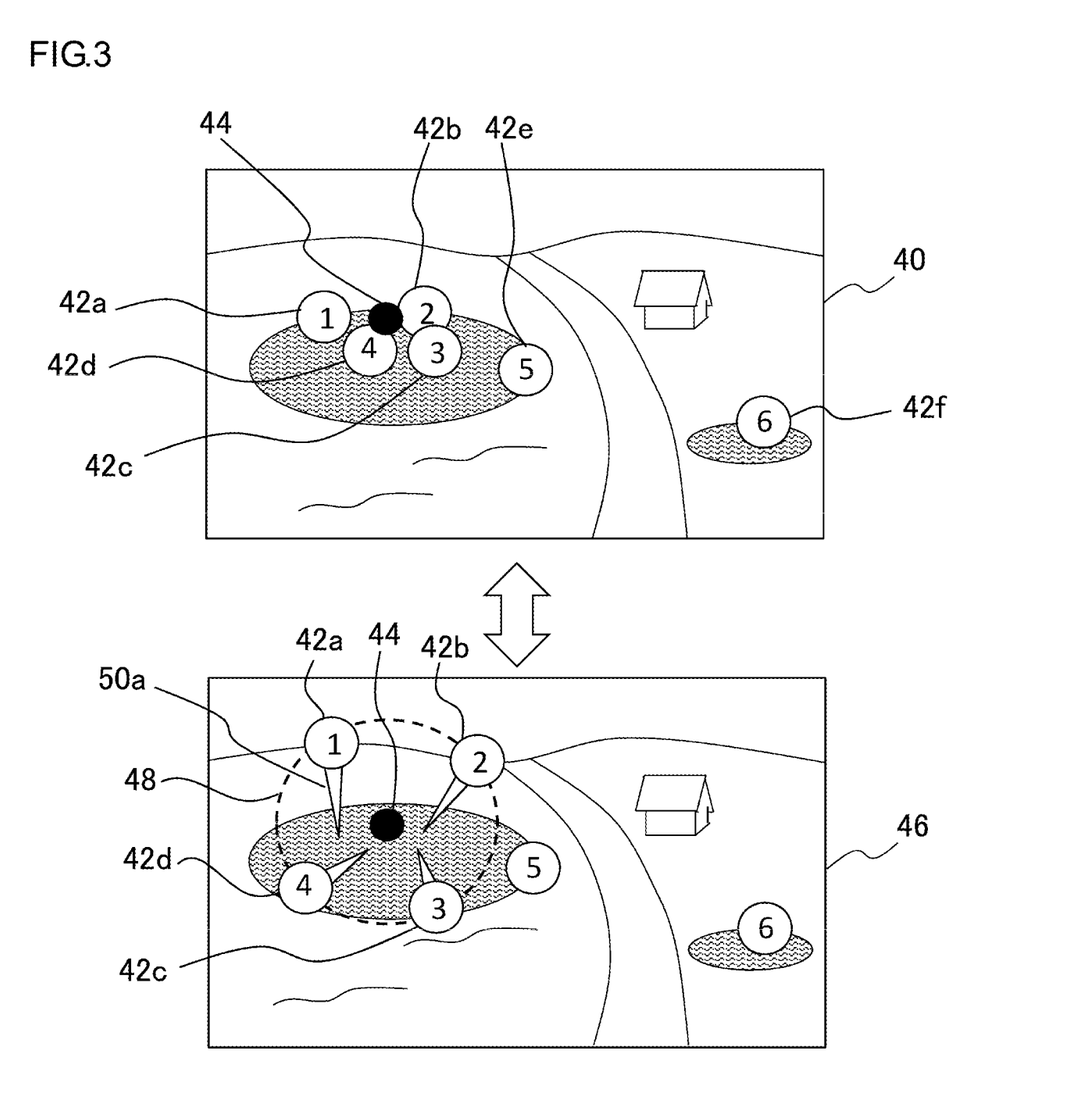
FIG. 3 illustrates exemplary display images before and after a change of locations of GUIs.

FIG. 3 illustrates an exemplary display images before and after a change of locations of GUIs. In a normal display mode, an image 40, displayed on the display 14, which expresses a virtual world, for instance, is first displayed as a result of information processing performed by the content processing unit 24 according to a content item. In the image 40, the locations where items are selectable are indicated by six icons 42a, 42b, 42c, 42d, 42e, and 42f.

Though, in FIG. 3, graphics marked with the encircled numbers "1" to "6" are the icons 42a, 42b, 42c, 42d, 42e, and 42f, respectively, the information and shape displayed as the icons are not limited to any particular ones and may be determined as appropriate at the time of content preparation. For example, the image of an item to be selected may be mimicked and used directly as an icon. Or the name thereof may be displayed as textual information. The GUI is not limited to the icon with which to select an item. The types of the GUI is not limited to any particular ones so long as it is an image indicating an option to receive the selection input through the user's contact. For example, the GUI may be icons, buttons and the like with which to select a function or file provided by the information processing apparatus 10.

Figure 4:
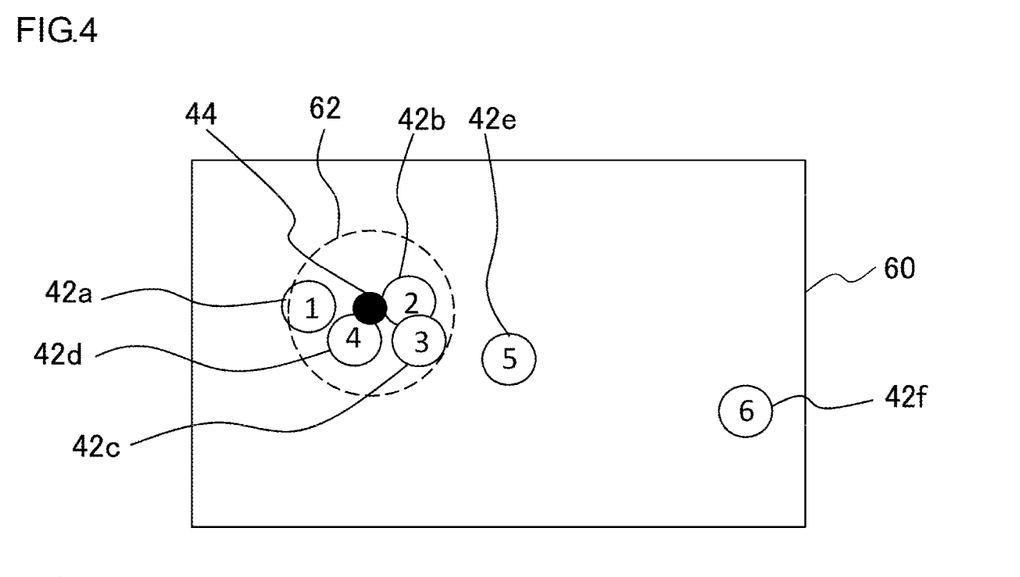
FIG. 4 is a diagram to explain a method whereby an operating information conversion unit determines whether the locations of a plurality of icons are to be varied or not, according to an embodiment.

When, in the image 40, the user touches a contact point 44 indicated by the filled black circle, the operating information conversion unit 22 determines whether there are plurality of icons in a predetermined range from the contact point 44 or not. Assume, for example, in FIG. 4 that the four icons 42a, 42b, 42c and 42d marked with "1" to "4", respectively, are located within the predetermined range. Then, the arrangement of the four icons 42a, 42b, 42c and 42d is varied such that the spaces between the four icons are enlarged, under the control of the GUI location control unit 26. Image 46 of FIG. 4 illustrates the arrangement thereof after the spaces therebetween have been widened. It is appreciated here that the "predetermined range" serving as a decision criterion based on which the arrangement thereof is varied may differ for each icon. Concrete examples will be discussed later.

In the image 46, the four icons 42a, 42b, 42c and 42d are placed on a circle, having a predetermined radius, at equal spaces therebetween wherein the center of the contact point 33 is at the center of the circle. That is, N icons are placed in the N respective positions where the circle 48 is divided into N equal parts. Then, a pointer graphic, such as a pointer graphic 50a for the icon 42a, which points toward the original position of each icon in the original (initial) image 40 is attached to each icon. Besides a needle-like shape as shown in FIG. 3, the pointer graphic may be of any arbitrary form, such as arrow, straight line and curved line, so long as the point graphic can associate the icon with its original position. Each icon is preferably placed in a position near its original position in order that the pointer graphic does not intersect or overlap with the other ones.

A transition stage from the image 40 to the image 46 may be expressed by actions, such as an animation, where the pointer graphic expands while each icon is moving. A touch for the contact point in the original image 40 may be a "touch" in a general sense such as a contact with the touch panel 12 for a short time, and the user may release his/her finger in the image 46 at the time when the image 46 after the change is displayed. It should be noted here that the black circle representing the contact point 44 and the circle 48 depicted in FIG. 3 are for illustration purposes only and are not necessarily displayed on the screen (or even does not have to be displayed at all in the actual setting).

However, the image may be processed such that the contact point 44 and the circle 48 can be viewed or visually recognized for the purpose of rendering a special effect or the like. If, for example, the icons selectable are limited to only the icons 42a, 42b, 42c and 42d whose locations have been moved, the following special rendering may be performed in order to make these four icons far more conspicuous than the other icons and images. That is, a region surrounded by the circle 48 or a band-like region with the circle 48 as the center curved line is subjected to shading-off effect or is filled with a single color. A line, a rectangle, a polygon, a shape resembling a symbol of some sort, and the like may be used in place of the circle 48. Also, the size of the circle 48 may be adaptively varied such that, for example, the greater the number of icons whose locations are to be changed is, the larger the size of the circle 48 will be.

When the user touches any one of icons located on the circle 48 while the image 46 after the change is being displayed, the operating information conversion unit 22 recognizes that the icon has been selected and identifies the operation input corresponding to the selected icon, and thereby the content processing unit 24 performs the information processing as appropriate. For example, an item represented by the selected icon is zoomed up; the content of a file associated with the icon is displayed; or another program associated with the icon is started. An operation on the icon selected may be performed at once such that the contact point is moved continuously from a starting point to an ending point. Here, the starting point corresponds to the touch of the contact point 44 in the image 40, and the ending point correspond to the touch of a desired icon in the image 46 after the change.

When, on the other hand, the user touches a predetermined region other than the icons located on the circle 48 (e.g., a region outside the circle 48), the icons whose locations have been changed are restored to the original positions under the control of the GUI location control unit 26 and thereby the image 40 is displayed again. At this time, by invalidating the contact on icons other than the icons moved onto the circle 48, no confusion will arise between the operation of restoring the locations of icons to the original positions and the operation of selecting an icon. Alternatively, a graphic or figure may be displayed so that the original position of the contact point 44 can be viewed and thereby the contact on this graphic may work to restore the locations of icons to the original positions thereof. In this case, any of the icons located outside the circuit 48 may also be selected.

FIG. 4 is a diagram to explain a method whereby an operating information conversion unit determines whether the locations of a plurality of icons are to be varied or not. In FIG. 4, a rectangle 60 represents a screen plane, and it is assumed that the six icons 42a, 42b, 42c, 42d, 42e, and 42f as shown in FIG. 3 are arranged similarly. The operating information conversion unit 22 constantly acquires the positional coordinates of each icon in a screen coordinate system determined by the content processing unit 24 through a process concerning the displaying of content.

As the input/output control unit 20 conveys the positional information on the contact point 44 on the touch panel 12, the operating information conversion unit 22 converts the positional information thereon into the positional coordinates in the screen coordinate system. Though the icons 42a, 42b, 42c, 42d, 42e, and 42f and the contact point 44 are expressed as circles, the information stored in the operating information conversion unit 22 is the coordinates of the centers, for instance.

Then a circular decision region 62 having a predetermined radius with the coordinates of the contact point 44 located at the center of the circular decision region is set, and an icon or icons whose positional coordinates lie within the decision region 62 is/are detected. That is, detected is/are an icon or icons whose distance from the contact point 44 is less than or equal to a threshold value which is the predetermined radius. If there are a plurality of such icons, it will be determined that the arrangement of locations of such icons needs to be changed and then the presence of such icons will be conveyed to the GUI location control unit 26. In this case of FIG. 4, the icons 42a, 42b, 42c, and 42d are detected and the thus detected icons are placed on a circle at equal intervals therebetween, as shown in FIG. 3.

The radius of the decision region 62 is determined according to the size of screen, the size of icon to be displayed, the average size of fingers, and so forth. The thus determined information may be added to the content file, so that, for example, the radius thereof can be varied according to the content. It is preferable that the size of a circle on which the icons are placed (e.g., the size of the circle 48 as shown in FIG. 3) is larger than that of the decision region 62. This gives an impression of a display change more suitable to achieve the purpose of expanding the closely located icons.

Figure 5:
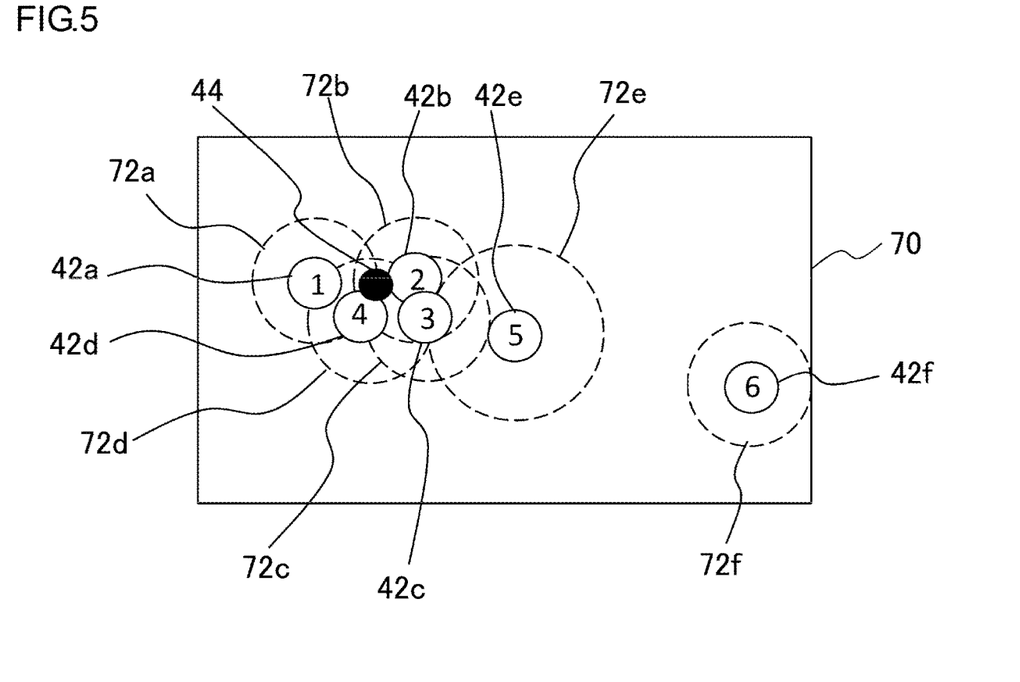
FIG. 5 is a diagram to explain another method whereby an operating information conversion unit determines whether the locations of a plurality of icons are to be varied or not, according to an embodiment.

FIG. 5 is a diagram to explain another method whereby an operating information conversion unit determines whether the locations of a plurality of icons are to be varied or not. The configuration of this figure and the arrangement of icons are similar to those shown in FIG. 4. In this case, the operating information conversion unit 22 sets, for each icon, a decision region having a predetermined radius with the coordinates of each icon located at the center of the circular decision region, based on the coordinates of each icon acquired from the content processing unit 24. In the FIG. 5, decision regions 72a, 72b, 72c, 72d, 72e, and 72f are set for the icons 42a, 42b, 42c, 42d, 42e, and 42f, respectively.

Then an icon or icons that contain/contains the coordinates of the contact point 44 lying within the decision regions is/are detected. In this case, too, detected is/are an icon or icons whose distance from the contact point 44 is less than or equal to a threshold value which is the radius of each decision region. If there are a plurality of such icons, it will be determined that the arrangement of locations of such icons needs to be changed. In this case of FIG. 5, the icons 42a, 42b, 42c and 42d are placed on a circle at equal spaces therebetween. When this determining method is employed, the radii of the decision regions may be identical among them or may differ for each icon. For example, the size of the decision region 72e set for the icon 42e denoted as "5" in FIG. 7 is larger than the size of the decision regions of the other icons.

If the size of the decision region is set to a larger value, an icon located a bit far from the contact point 44 can be among those selectable in the image where the arrangement of icons has been changed. Using this property, the size of a decision region is made to vary depending on the frequency of being selected and the level of importance. Hence, the chance of being among those selectable can be increased or reduced and therefore the selection efficiency is improved. The information concerning the size of the decision region of each icon determined according to the level of importance and the like may be included in the content file. If the importance level of an icon varies according to the progress degree of a game and the like, several different patterns may be set for the size of the decision region and those patterns may be switched according to the progress degree thereof.

Such a mode of increasing or reducing the chance of being among those selectable can be achieved in the case of FIG. 4 as well. That is, two different sizes (i.e., one large and the other small in size) of decision regions whose center is the contact point 44 are prepared and the importance level is assigned to each icon beforehand. And then, all icons located within a small decision region, and icons, other than those icons located within the small decision region, located within a large decision region and whose importance level is greater than or equal to a threshold value are set as those selectable. Hence, even if an icon or icons are located a bit far from the contact point, such an icon or icons having a higher importance level can be set to those among selectable. Similarly, three or more different sizes of decision regions may be prepared and therefore the icons may be determined in multiple stages.

A description is now given of an operation of the information processing apparatus 10 achieved by the above-described structure. Since the information processing and image display processing other than the processing related to the selection operation among a plurality of GUIs may be conceivable in various manners and are executed as appropriate using a general technique, a description thereof is omitted here.

Figure 6:
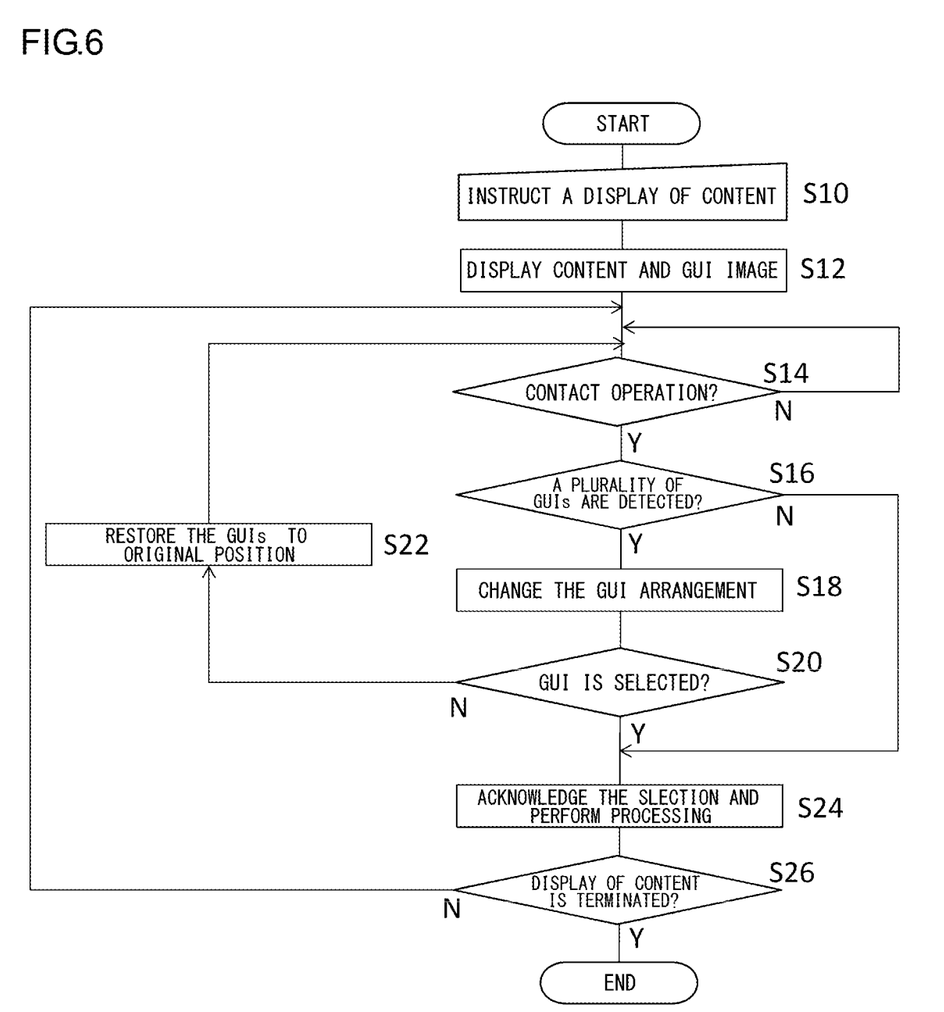
FIG. 6 is a flowchart showing a processing procedure, where an information processing apparatus receives a GUI selection input, in an embodiment.

FIG. 6 is a flowchart showing a processing procedure where the information processing apparatus 10 receives a selection input of GUI. As the user first enters, via the touch panel 12, an instruction to start a display by selecting a content item from a menu screen displayed on the display 14 (S10), the content processing unit 24 and the display image generator 30 read necessary data from the content file storage 16 and displays an image of the content item and an image of GUI (S12).

In this condition, the information processing unit 10 waits ready until the user touches the touch panel 12 (N of S14). During this time, the processing, concerning contents, other than the processing of receiving the selection of GUI and the display updating may be performed as appropriate. When the user touches the touch panel 12, the operating information conversion unit 22 detects the contact with the touch panel 12 (Y of S14). Then carried out is either the process of determining if the positional coordinates of GUI lies inside or outside the decision region that surrounds the contact point, as described in connection with FIG. 4 or the process of determining if the contact point lies inside or outside the decision region that surrounds the GUI, as described in connection with FIG. 5. By carrying out either one of the processes, whether or not there are a plurality of GUIs within a predetermined range from the contact point can be determined (S16).

When a plurality of GUIs are detected near the contact point (Y of S16), the GUI location control unit 26 determines the positions of the respective GUIs so that the plurality of GUIs are located on a circle, with the circle's center at the contact point, at equal spaces between the respective GUIs, and the display image generator 30 updates the display (S18). At this time, not only the positional coordinates of the contact point and the identification information on GUIs but also the original (initial) positional coordinates of the GUIs are conveyed from the operating information conversion unit 22, and the GUI location control unit 26 temporarily stores the coordinate positions in the internal memory or the like.

If the user touches the touch panel 12 to select any one of GUIs in the image where the arrangement of locations of GUIs has been changed (Y of S20), the operating information conversion unit 22 will detect the contact on the touch panel 12, then identify the content associated with the selected GUI, and convey the identified content to the content processing unit 24 and thereby the information processing suitable to the identified content will be performed as appropriate (S24). If, on the other hand, no GUIs is selected in the image where the arrangement of locations of GUIs has been changed and if the user touches any of other predetermined regions on the touch panel 12 (N of S20), the operating information conversion unit 22 will convey this to the GUI location control unit 26 and thereby restore the locations of GUIs to the original positions (S22).

In this state, the information processing unit 10 waits ready till the next contact operation (N of S14). When the GUIs are to be restored to the original positions, the original positional coordinates stored in the internal memory and the like in Step S18 are referenced. If there is only a single GUI near the contact point in Step S16 (N of S16), the operating information conversion unit 22 will determine that this single GUI is selected, identify the operation input associated with this GUI and convey the thus identify operation input to the content processing unit 24 (S24).

If the user does not enter his/her instruction to terminate the displaying of content (N of S26), the processes of Steps S14 to S24 are repeated; if the user enters his/her instruction to terminate it, the processing is terminated (Y of S26). If as a result of the information processing in Step S24 it is determined that displaying the GUIs available to choose from (as options) is no longer required, the processing shown in this flowchart will be also terminated.

By employing the above-described embodiments, when a GUI is selected through a contact with the touch panel from among the GUIs displayed on the display provided in the information processing apparatus, which indicate the functions available to choose from, such as icons, the presence or state of a plurality of GUIs located near the contact point is detected. And the image where the spaces between the plurality of GUIs are enlarged is displayed. Then a selection input from any one of the GUIs is received and the processing corresponding to the received selection input is carried out. As a result, the undesired situations are eliminated even if the GUIs are too closely located to each other and therefore the selection operation becomes easier. Here, the undesired situations include a situation where the selection of GUI not intended by the user is recognized with the result that a careful contact operation is forced upon the user to avoid the selection of the unintended GUI.

The achievement of a more potent effect is expected of the structure employed in the present embodiments when a contact with the touch panel is effected using a finger by which the contact is made through an area rather than a point and where a point detected as the contact point is spread over a relatively wide range. Also, the achievement thereof is expected when a smaller device in size is used where the size of GUIs is subjected to the limitation. Also, the present embodiments significantly minimize the attentions directed toward the arrangement of GUIs due to the change of screen size and therefore the burden otherwise placed on the content creators at the time of creating contents are reduced.

A plurality of GUIs lying close to each other are placed on a circle at equal spaces therebetween wherein the center of the contact point is at the center of the circle. And a pointer graphic indicating the original position of each GUI is attached to each GUI. If the selection operation is to be interrupted, contacting a region other than the GUIs starts restoring the GUIs, which have been moved, to the original positions. The movement of GUIs onto the circle and the restoration thereof to the original positions are changes within the restrictive region surrounding the contact point. Thus, the change can be recognized without significantly changing the viewing location of the user. Furthermore, even when displaying the additional pointer graphics, the image does not become complex. As a result, the GUI to be selected can be easily and reliably selected without losing the sight of the GUI.

Further, the decision region(s) by which to determine whether the GUIs are located too close to each other or not is/are adaptively set according to the size of GUIs, the screen size, the content image and the like. This can suppress the occurrence of inconveniences where the icons are moved more than necessary, the intended GUI is excluded from the GUIs selectable, and so forth. By setting the decision region for each icon, the determination can be optimized more finely according to the importance level of each icon and the like.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

For example, in the present embodiments, the contact operation with touch panel by the user is detected as the input information. The input information is not necessarily the contact operation to the touch panel so long as the user can enter the position on an image as an indication point. For example, the position in a display image may be specified and inputted by operating a pointer or an icon displayed on the display image by using a pointing device such as a mouse, a trackball, a track pad, and a joystick.

Regardless of whether the touch panel is to be employed or not, the position acquired as the input information may be expressed as one in units of "point" such as the positional coordinates of a contact point described in the above-described embodiments or may be expressed in units of region having a certain area. For example, a known art may be applied to input operation, where a boundary is so drawn by moving a pointer as to surround a desired region and then a part of graphic or the like within the desired region is selected. If, in this case, there are a plurality of GUIs in the specified region, the locations of the GUIs are so varied as to widen the spaces between the GUIs. At this time, the center of a circle shaping the arrangement of GUIs may be identical to the center of gravity of the specified region, for instance. If there is only a single GUI in the specified region, the processing same as that performed when this GUI is directly selected may be performed.

In the present embodiments, the arrangement of locations of GUIs is changed in such a direction that the spaces therebetween are enlarged. However, the same advantageous effects as those of the present embodiments can be achieved if, depending on the purpose, the arrangement is varied in such a direction that the spaces between the distributed GUIs are narrowed. Now apply this technique to the following case. That is, if there are a plurality of kinds of GUIs, a plurality of GUI groups are formed by gathering them together for each type and they may be arranged at equal intervals as shown in FIG. 3 in a unit of GUI group. For example, suppose that many game characters represented by GUIs are moved around or they are moved by itself, with the result that the characters are confused in a very dense state regardless of their types and therefore it becomes hard to operate. In such a case, the GUIs may be arranged with making some masses according to the types so as to allow the movement in the unit of mass.

The types of GUIs are set in association with the image data of the GUIs and the like in advance. Once the GUI location control unit 26 splits the GUIs to be operated, based on the correspondence information, the subsequent processing will be same as that described in the above-described embodiments. In such a case, even if the GUIs to be gathered together are originally distributed, they can be freely selected by specifying a region as an input information. When the operation is enabled and carried out for each of the types that have been gathered together as described above, this technique is especially effective with a device, such as a mobile device whose size of the display is restrictive, where it is more likely to be difficult to operate on each of GUIs that are placed closely to each other.

What is claimed is:

1. A method for varying icons on an information processing device, the method comprising:
   displaying, on a display of the information processing device, a plurality of icons in a display image at initial positions,
   wherein each icon is assigned a decision region surrounding the icon,
   wherein a size of a decision region of a first icon is larger than a size of a decision region of a second icon, and
   wherein each decision region is a circle centered at a corresponding icon;
   acquiring, by an operation information acquiring circuit, a touch point inputted by a user on the display;
   determining a subset of the plurality of icons to vary by determining if the decision region of each icon intersects with the touch point;
   moving all icons in the subset of the plurality of icons from their initial positions to selection positions on a selection circle centered at the touch point, wherein the subset of the plurality of icons are positioned at equal intervals around the selection circle;
   acquiring, by the operation information acquiring circuit, a subsequent touch point on the display from the user for selecting an icon from the subset of the plurality of icons,
   wherein the decision region of each icon of the subset is not used to determine when an icon is selected;
   causing an action associated with the selected icon to be performed in response to the subsequent touch point; and
   repeatedly increasing a size of the decision region of each of the subset of the plurality of icons based on:
   an importance level, and
   an increase in a selection frequency of each of the plurality of icons.

2. The method according to claim 1, wherein the importance level varies according to the progress degree of a game.

* * * * *